Patented Aug. 15, 1950

2,519,319

UNITED STATES PATENT OFFICE 2,519,319

METHOD OF PREPARING CHLORANIL

Earl T. McBee and Jack S. Newcomer, West Lafayette, Ind., assignors to the United States of America as represented by the United States Atomic Energy Commission No Drawing. Application January 7, 1946,
Serial No. 639,710

2 Claims. (Cl. 260—396)

This invention relates to the manufacture of oxygen derivatives of cyclic hydrocarbons and particularly to the production of halogenated aromatic acids and halogenated quinones.

It is known that certain omega-halogenated alkyl-benzenes may be hydrolyzed to produce carboxylic acids. Halogenated quinones on the other hand have been obtained by halogenation of quinone.

It is an object of the present invention to provide a new method for making chlorinated aromatic carboxylic acids and quinones. A further object is to provide a new method for the manufacture of chlorinated quinones from aromatic compounds not previously employed for the production of these materials.

In accordance with the invention a polyfluoroalkyl benzene is reacted with antimony pentafluoride and the reaction product is hydrolyzed to produce oxygen derivatives corresponding to the polyfluoro-alkyl benzene. We do not claim herein the single step of reacting a polychloroalkyl benzene with antimony pentafluoride.

Pentachlorobenzotrifluoride has been converted by mild treatment followed by hydrolysis to pentachlorobenzoic acid and by more vigorous treatment followed by hydrolysis to tetrachloroquinone or chloranil. Ring chlorinated omega-chlorofluoro-ethyl benzenes and ring-chlorinated bis-trifluoromethyl benzenes also may be treated with antimony pentafluoride and the products hydrolyzed to produce chloranil. By similar treatment of a polychloropolyfluoroalkylbenzene containing two chlorine atoms in the ring, the di-chloroquinone may be obtained.

The reaction with antimony pentafluoride may be conducted at temperatures from about room temperature up to several hundred degrees centigrade. At low temperatures the reaction seems to stop with the formation of an intermediate hydrolyzable to a halogenated benzoic acid derivative. Thus at about 27° C. nearly theoretical yields of pentachloro-benzoic acid have been obtained from pentachlorobenzotrifluoride. By reacting the same compound at a temperature of about 100° C. a derivative having the properties of monohydroxytetrachlorobenzoic acid is obtained. Upon reaction of this intermediate with antimony pentafluoride at temperatures in the neighborhood of 150° C. an intermediate hydrolyzable to chloranil may be obtained. From these data it may be concluded that the reaction proceeds progressively through a halogenated benzoic acid stage and a hydroxy-substituted halogenated benzoic acid stage to the chloranil stage, the stages representing organic antimony salt addition compounds. By suitable control of the reaction it may be stopped at either of the intermediate stages or allowed to proceed directly to completion. Hydrolysis converts the material at any of these stages to oxygenated compounds. The hydrolysis may be effected by treatment of the products with water acidified with any acid capable of forming water-soluble salts of antimony. Prolonged treatment or heating is unnecessary.

The intermediate stage organic acids are convertible by antimoy pentafluoride to the organic antimony salt addition compounds of the next successive stage. Thus the invention make possible the conversion of pentachlorobenzoic acid or hydroxy-tetrachlorobenzoic acid, prepared in any manner, to chloranil.

In some cases the quinone has been produced in the enolic form. This can be converted to the quinonoid form in conventional manner by treatment with a suitable oxidizing agent. In most instances the atimony pentafluoride serves as an oxidizing agent and produces the chloranil.

The process may be conducted in the presence of chlorine to maintain the antimony in petavalent state. This is not necessary, however, and the process proceeds satisfactorily in the absence of such oxidizing agents.

Example 1

Forty grams of pentachlorobenzotrifluoride and 300 grams of antimony pentafluoride were stirred at 27° C. for 24 hours. The reaction mixture was poured into a hydrochloric acid solution containing ice. A white solid precipitated and was separated from the solution by filtration. It was dissolved in a 10% solution of sodium hydroxide and was reprecipitated by addition of concentrated hydrochloric acid until acid to litmus paper. The reprecipitated product was separated from the solution and washed with water. Thirty-five grams of a white solid melting at 197–199° C. was obtained containing 59.9% Cl and 0.0% F. These data indicate the product to be pentachlorobenzoic acid.

Example 2

Fifty grams of pentachlorobenzotrifluoride and 500 grams of antimony pentafluoride were placed in a 500 ml. glass distilling flask equipped with a condenser. The contents of the flask were heated to 95° C. for one and one-half hours; the temperature was raised gradually in the next hour to 125° C. and then in a period of one-half hour to 155° C. Distillate, probably comprising monochloro and dichloropolyfluorocyclic six carbon atom compounds, was collected over the temperature range 76–155° C. The distillation residue was poured into an ice-hydrochloric acid mixture which was vigorously stirred during the addition. A white solid precipitated and this product was separated from the mother liquor, washed once with concentrated hydrochloric acid and once with water. It was then recrystallized from methanol. The recrystallized product, amounting to 8 grams, was a white solid melting at 200–201° C. and containing 60.2% Cl and 0.0% F. It was soluble in dilute potassium hydroxide solution and was reprecipitated from the basic solution by acidification with hydrochloric acid. The product accordingly was identified as pentachlorobenzoic acid.

Example 3

Seventy grams of pentachlorobenzotrifluoride and 102 grams of perfluoro-1,3-dimethyl-cyclohexane solvent were introduced into a 3-neck flask provided with a stirrer, reflux condenser, and dropping funnel. In a period of 4 hours 400 grams of antimony pentafluoride was introduced gradually from the dropping funnel into the vigorously stirred mixture while the temperature was increased from 50° to 90° C. by warming over a small flame. After all of the antimony pentafluoride had been added, the reaction mixture was stirred for an additional three hours at 95° C. The mixture was then allowed to cool. It formed two layers, the upper layer a colorless liquid and the lower layer a purple liquid. These layers were separated and the upper layer was washed with concentrated hydrochloric acid solution and then with water and was finally dried with anhydrous calcium sulfate and distilled. It distilled at 100–101° C. and was identified as the solvent which was used in the SbF$_5$ treatment (perfluoro-1, 3-dimethyl-cyclohexane). The lower layer was poured into iced hydrochloric acid and a white solid precipitated. The solid, after separation from mother liquor, was washed and redissolved in hot methanol from which it was recrystallized by cooling. The recrystallized solid had a melting range of 170–187° C. and contained 50.5% Cl and 0.0% F. It was inert to boiling concentrated nitric acid solution. Analytical data indicated that this solid was mainly tetrachloro-hydroxy-benzoic acid (51½% Cl).

Example 4

Sixty grams of the solid product of the preceding example and 300 grams of antimony pentafluoride were placed in a 3-neck glass flask equipped with a stirrer and a condenser. The flask was heated to 90° C. and maintained at this temperature for two hours. It was then heated to 110° C. for 1 hour, to 130° C. for 2 hours and finally to 150° C. for 1 hour. No distillate was obtained. The reaction mixture was cooled and poured into a mixture of ice and hydrochloric acid, whereupon 58 grams of a white solid precipitated. The solid was separated from the aqueous solution, washed with water, dissolved in hot methanol and reprecipitated by cooling. The recrystallized product was faintly yellow and by treatment with concentrated aqueous nitric acid solution a small portion was converted to a definitely yellow solid. Upon exposure to air for 16 hours the main portion of the product turned bright yellow. The yellow product was analyzed and found to contain 57.7% chlorine. It sublimed at 253° C., and upon treatment with dilute potassium hydroxide, formed dark red crystals. These properties identified the product as chloranil. It was concluded that the nearly colorless intermediate was tetrachlorohydroquinone.

Example 5

One hundred seventy grams of pentachlorobenzotrifluoride and 950 grams of antimony pentafluoride were introduced into an aluminum vessel equipped with a stirrer, a reflux condenser, an inlet for chlorine gas, and an outlet leading to a vent. The contents of the vessel were heated at 75° C. for 16 hours while chlorine gas was bubbled through the mixture. The temperature was then increased to 90° C. and maintained there for one hour while passage of chlorine was continued. The reaction mixture was cooled to room temperature. Upon pouring a small amount of the reaction product, which was a purple liquid, into iced hydrochloric acid an orange solid was formed. The balance of the mixture was heated to 200° C. in the aluminum vessel under partial vacuum to distill off antimony pentafluoride. Less than 20 grams of distillate was obtained. When a small portion of the resulting reaction product was dropped into an ice-hydrochloric acid solution, a yellow solid was obtained which was identified as chloranil. The balance of the reaction product was mixed with about 1 liter of carbon tetrachloride; a vigorous evolution of gases ensued but the temperature remained at 27–30° C. After bubbling had subsided, about 750 grams of carbon tetrachloride was added and the mixture was heated at 60° C. for two hours. The resulting mixture was cooled to room temperature and filtered. A brown residue was obtained. About 50 cc. of 20% hydrochloric acid solution was poured onto this brown solid to wash away any remaining antimony salts. The temperature rose to about 60° C. and the mixture bubbled vigorously giving off an obnoxious odor. The product became orange yellow. It was washed with water and dried. One hundred and thirty-one grams of a solid orange-yellow product was obtained. It was identified as chloranil as in Example 4.

Example 6

A polychloropolyfluoroethylbenzene containing 62.3% chlorine and 10.2% fluorine, corresponding to a mixture of halogenated compounds of the empirical formulae C$_8$HCl$_7$F$_2$ and C$_8$HCl$_6$F$_3$ in which the hydrogen is located in the ring and the fluorine in the side chain, was placed with 9 times its weight of antimony pentafluoride in a glass 3-neck flask equipped with a reflux condenser. The contents of the flask were heated to 100° C. for 1 hour. Then the reaction mixture was allowed to cool and the reflux condenser was replaced by a glass tube leading to an ice-packed condenser. The contents of the flask were then heated to 150° C. and the volatile material distilled. The residue in the reaction flask was cooled and aqueous concentrated hydrochloric acid solution was added gradually to it. The solid which formed was washed with concentrated hydrochloric acid and recrystallized from methanol as described in Example 3. Eleven grams of a brilliant yellow crystalline solid was obtained, which sublimed at 253° C., contained approximately 56% chlorine, and upon treatment with dilute potassium hydroxide, formed dark red crystals. The product was thus identified as chloranil.

Example 7

One hundred grams of a chlorinated benzotrifluoride distillate boiling in the range 180–200° C., containing 40% chlorine and 24% fluorine, and comprising mainly dichloro and tetrachloro benzotrifluorides, was mixed with 500 grams of $SbF_5$ in a 3-neck glass flask provided with a reflux condenser, a stirrer and a thermometer. The mixture was heated to 90° C. and held at this temperature for 3 hours, then to 120° C. where it was held for 2 hours and finally at 150° C. for one hour. No refluxing occurred. The reaction mixture was cooled and then poured into a mixture of ice and hydrochloric acid solution. A yellow-orange solid precipitated. The solid was separated by filtration and recrystallized from acetone. It contained 43.5% chlorine and no fluorine and melted at 107–109° C. These data indicate that the product was dichlorobenzoquinone containing a minor proportion of chloranil as an impurity.

It will be understood that we intend to include variations and modifications of the invention and that the preceding examples are illustrations only and in no wise to be construed as limitations upon the invention, the scope of which is defined in the appended claims, wherein we claim:

1. The method of preparing chloranil which comprises heating pentachlorobenzotrifluoride with a substantially larger quantity of $SbF_5$ in a temperature range running from 50° to 95° C. in a solvent medium composed of perfluoro-1,3-dimethyl-cyclohexane, separating the solvent medium from the reaction product, hydrolyzing the reaction product thereby obtaining tetrachloro-hydroxy-benzoic acid, reacting said tetrachloro-hydroxy-benzoic acid with a substantially larger amount of $SbF_5$ in a temperature range running from 90° to 150° C., hydrolyzing the reaction product thus obtained to produce tetrachlorohydroquinone and oxidizing said tetrachlorohydroquinone to chloranil.

2. The method of preparing chloranil which comprises heating tetrachlorohydroxy-benzoic acid with a substantially larger amount of $SbF_5$ in a temperature range running from 90° to 150° C., hydrolyzing the reaction product thus obtained to produce tetrachlorohydroquinone and oxidizing said tetrachlorohydroquinone to chloranil.

EARL T. McBEE.
JACK S. NEWCOMER.

REFERENCES CITED

The following references are of record in the file of this patent:

UNITED STATES PATENTS

| Number | Name | Date |
| --- | --- | --- |
| 1,878,463 | Britton | Sept. 20, 1932 |